(12) United States Patent
Enenkel

(10) Patent No.: US 10,370,203 B2
(45) Date of Patent: Aug. 6, 2019

(54) DEVICE AND METHOD FOR HANDLING OBJECTS

(71) Applicant: SIEMENS AKTIENGESELLSCHAFT, Munich (DE)

(72) Inventor: Peter Enenkel, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 45 days.

(21) Appl. No.: 15/103,950

(22) PCT Filed: Dec. 9, 2014

(86) PCT No.: PCT/EP2014/076974
§ 371 (c)(1),
(2) Date: Jun. 13, 2016

(87) PCT Pub. No.: WO2015/086559
PCT Pub. Date: Jun. 18, 2015

(65) Prior Publication Data
US 2016/0311633 A1    Oct. 27, 2016

(30) Foreign Application Priority Data

Dec. 13, 2013   (DE) .................. 10 2013 225 927

(51) Int. Cl.
*B65G 57/112* (2006.01)
*B65G 67/08* (2006.01)
(Continued)

(52) U.S. Cl.
CPC ............... *B65G 67/08* (2013.01); *B64F 1/32* (2013.01); *B64F 1/368* (2013.01); *B65G 21/10* (2013.01);
(Continued)

(58) Field of Classification Search
CPC .... B65G 57/035; B65G 57/11; B65G 57/112; B65G 67/08; B65G 41/008; B65G 21/10;
(Continued)

(56) References Cited

U.S. PATENT DOCUMENTS 3,140,770 A    7/1964  Herring et al.
3,835,980 A *  9/1974  Brooks, Jr. ............ B65G 15/26
                                                       198/812
(Continued)

FOREIGN PATENT DOCUMENTS

CN    203332996 U    12/2013
DE    60113426 T2    1/2006
(Continued)

Primary Examiner — Jeffrey A Shapiro
(74) Attorney, Agent, or Firm — Laurence Greenberg; Werner Stemer; Ralph Locher

(57) ABSTRACT

A device for handling objects includes an unloading head, onto which the objects can be transported and from which the objects can be unloaded by an operator. A lifting apparatus is connected to the unloading head. The height of the unloading head can be adjusted by way of the lifting apparatus and a sensing apparatus that can be activated and the height of the unloading head can be adjusted. In order to achieve a throughput increase in the handling of objects, the sensing apparatus is arranged in such a way that the sensing apparatus can be triggered by the operator by way of an object that is located on the unloading head.

16 Claims, 5 Drawing Sheets

(51) Int. Cl.
*B65G 57/03* (2006.01)
*B65G 57/11* (2006.01)
*B65H 29/66* (2006.01)
*B64F 1/32* (2006.01)
*B64F 1/36* (2017.01)
*B65G 21/10* (2006.01)
*B65G 21/14* (2006.01)
*B65G 41/00* (2006.01)
*G05B 19/042* (2006.01)

(52) U.S. Cl.
CPC ............ *B65G 21/14* (2013.01); *B65G 41/008* (2013.01); *B65G 57/035* (2013.01); *B65G 57/11* (2013.01); *B65G 57/112* (2013.01); *B65H 29/66* (2013.01); *G05B 19/042* (2013.01); *G05B 2219/2621* (2013.01)

(58) Field of Classification Search
CPC ...... B65G 21/14; B65H 29/66; G05B 19/042; G05B 2219/2621; B64F 1/32; B64F 1/368
USPC ....... 414/277, 278, 281, 282, 285, 398, 673, 414/676, 677, 792.8, 793.4, 793.6, 793.8, 414/794.4, 794.5, 794.8, 799; 108/139, 108/140, 141; 198/511, 528, 535, 536, 198/538, 861.4, 861.5
See application file for complete search history.

(56) References Cited

U.S. PATENT DOCUMENTS

| | | | |
|---|---|---|---|
| 5,325,953 A | 7/1994 | Doster et al. | |
| 5,642,803 A | 7/1997 | Tanaka | |
| 5,697,753 A * | 12/1997 | Aurora | B65G 67/08 414/398 |
| 5,718,325 A | 2/1998 | Doster et al. | |
| 6,471,044 B1 * | 10/2002 | Isaacs | B65G 43/08 198/347.4 |
| 6,481,563 B1 * | 11/2002 | Gilmore | B65G 21/14 198/511 |
| 6,484,862 B1 * | 11/2002 | Gilmore | B65G 21/14 193/35 TE |
| 7,631,640 B2 | 12/2009 | Hofbauer et al. | |
| 7,641,043 B2 | 1/2010 | Vestergaard | |
| 9,038,828 B2 | 5/2015 | Enenkel | |
| 2003/0029694 A1 * | 2/2003 | Gilmore | B65G 21/14 198/313 |
| 2007/0012548 A1 * | 1/2007 | Yang | B65G 21/14 198/812 |
| 2009/0169349 A1 | 7/2009 | Reed | |
| 2010/0236892 A1 * | 9/2010 | Jones | B65H 15/00 194/206 |
| 2013/0290495 A1 * | 10/2013 | Cheong | H04L 41/08 709/220 |

FOREIGN PATENT DOCUMENTS

| | | |
|---|---|---|
| DE | 202010012374 U1 | 12/2010 |
| DE | 102011080096 A1 | 1/2013 |
| EP | 0615925 A2 | 9/1994 |
| WO | 9854073 A1 | 12/1998 |
| WO | 2005092706 A1 | 10/2005 |
| WO | 2006017003 A1 | 2/2006 |

\* cited by examiner

DEVICE AND METHOD FOR HANDLING OBJECTS

BACKGROUND OF THE INVENTION

Field of the Invention

The invention relates to a device for handling objects, having an unloading head, on which the objects can be transported and from which the objects can be unloaded by an operator, a lifting means connected to the unloading head, by means of which the height of the unloading head can be adjusted, and a triggerable sensor apparatus, by means of which the lifting means can be activated.

The invention further relates to a method for handling objects, in which the objects are unloaded from an unloading head by an operator, a sensor apparatus is triggered and as a result the unloading head is height-adjusted by means of a lifting means.

Devices and methods of the type mentioned above are known in the prior art and are used, for instance, to load transport containers, airplanes or storage apparatuses. Here the unloading head is positioned such that an ergonomic and simple unloading of the objects by the operator is possible.

By way of example WO 2005/092706 A1 describes such a device. Further devices for handling objects are known from WO 98/54073, WO 2006/17003 A1 and DE 10 2008 136 721 A1.

In modern logistics centers or airports, an ever growing number of objects such as for instance pieces of luggage, packages or other cargo, must be loaded and unloaded within an increasingly shorter period of time. Thus with the device and method mentioned at the start, it is desirable for the throughput of objects handled in a given period of time to increase.

BRIEF SUMMARY OF THE INVENTION

The object underlying the present invention is therefore to improve the afore-cited device and the afore-cited method such that the throughput of objects can be increased.

For the afore-cited device, the object is achieved by the present invention in that the sensor apparatus is arranged such that it can be triggered by the operator by means of an item of cargo that is disposed on the unloading head.

For the afore-cited method, the object is achieved in accordance with the invention in that the sensor apparatus is triggered by the operator by means of an object that is disposed on the unloading head.

The invention is advantageous in that the height adjustment of the unloading head can be triggered with the operator grasping an object, thus rendering possible a very rapid positioning of the unloading head. A positioning of the unloading head by the operator before he grasps the object is unnecessary with the result that invention combines the work steps of positioning the unloading head, grasping and moving the object disposed on the unloading head. During these steps, heavy objects are in particular at least predominantly supported by the unloading head, so that there is no physical stress on the operator.

The invention can be further developed by various advantageous embodiments, which are described below and can be combined freely with one another.

The device can thus have a means of transport connected to the unloading head, by means of which the goods can be moved in a transport direction to the unloading head. This is advantageous in that a quick transportation of objects to the unloading head is ensured. Suitable means of transport may be for example conveyor belts, roller belts or chutes.

In order in particular to withstand the high demands of parcel logistics, the device for loading the objects can be embodied in a transport container and the unloading head can be arranged attached to the means of transport in the transport direction. Transport containers may be for instance swap body platforms, containers or truck loading spaces. The unloading head attached to the means of transport in the transport direction enables the device to be slid into the transport container particularly well, thereby simplifying the loading process for the operator.

In an advantageous embodiment, the sensor apparatus can be arranged behind the unloading head in the transport direction and/or to the side of the unloading head transverse to the transport direction. This is advantageous in that the sensor apparatus is triggered if the operator allows the object to project past the unloading head and thus initiates the unloading process. In this way the sensor apparatus can directly adjoin the unloading head, in order to ensure a rapid triggering and a rapid positioning.

To embody the sensor apparatus so that it is as wear-resistant as possible and as far as possible can be triggered without resistance, the sensor apparatus can be embodied as a camera or a light beam system. Alternatively, the sensor apparatus can be embodied as a switch. This is advantageous in that switches such as for instance push-buttons, proximity switches, micro switches or rope switches are available particularly cost-effectively and keep the manufacturing costs of the device low.

To enable the triggering of the sensor apparatus by means of a tilting motion of the object at the edge of the unloading head, the unloading head can define a support plane for the goods and the sensor apparatus can be arranged at the same height or below the support plane. A tilting motion is ergonomically suited, particularly with heavy objects, to triggering the sensor apparatus and thus to the height-adjustment of the unloading head, because an inadvertent triggering can be avoided and support of the object and less strain on the operator is still ensured.

Furthermore, the sensor apparatus can be embodied such that it can be triggered by means of an actuation force acting on it. This is advantageous in that the operator, with the object, has to deliberately apply the actuation force, which can act from above for instance, in order to effect the triggering of the sensor apparatus. Deliberate handling by the operator is thus required and an inadvertent triggering of the sensor apparatus can be ruled out.

In a further advantageous embodiment, the unloading head can define a support plane for the goods, and have an edge which delimits the support plane in the transport direction and/or transverse to the transport direction, wherein the sensor apparatus is integrated into at least one part of the edge or embodies at least one part of the edge. This is advantageous in that the sensor apparatus is integrated into the unloading head and as a result embodies a compact unit and the triggering of the sensor apparatus is triggered by tilting the object over the resultant sensor edge.

In order to convey the objects successively to the unloading head, the device can have a separating apparatus which separates the objects in the transport direction.

Furthermore, the device may be a balance, which is embodied to measure the weight of the objects, and a signaling means, which is embodied to output a signal for each object which can be perceived by the operator, the weight of which measured by the balance lies above a predetermined limit value. This is advantageous in that the operator is informed about heavy objects by means of the signaling means and only triggers the sensor apparatus with these heavy objects in order to optimize the height of the unloading head. Light-weight objects can be unloaded without lowering the unloading head.

In order to increase automation of the unloading process, the device may have a controller, which is connected to the sensor apparatus and the lifting means for signaling purposes, and which is embodied to automatically move the unloading head from a high position to a low position when the sensor apparatus is triggered. In this case the high position may be an ergonomically optimal height to move objects on the unloading head and the low position may be a suitable height above the platform of the operator, which allows heavy objects to roll down. When heavy objects are rolled down in this way, the operator does not need to lift the objects, they are instead initially supported by the unloading head and slide, in the low position, from there onto the base of the transport container for instance.

Furthermore, the controller can be embodied, after triggering the sensor apparatus, to move the unloading head from the low position back into the high position. The unloading head is thus automatically moved back into its starting position, the high position, since the sensor apparatus is no longer triggered by the object and the operator arranges the heavy object in the transport container. Since the objects are usually conveyed onto the unloading head in a mix of heavy and light-weight objects, a throughput increase is achieved by automatically moving back into the starting position.

In order to further optimize the handling of objects using the inventive device, the device may have a storage area arranged on the unloading head, which is embodied so as to temporarily store a number of objects. In particular, small, light-weight objects can be temporarily stored here, and can then be unloaded particularly quickly by the operator in groups.

BRIEF DESCRIPTION OF THE SEVERAL VIEWS OF THE DRAWING

The invention is explained below with reference to the exemplary embodiments in the appended drawings, in which.

DESCRIPTION OF THE INVENTION

Figure 1:
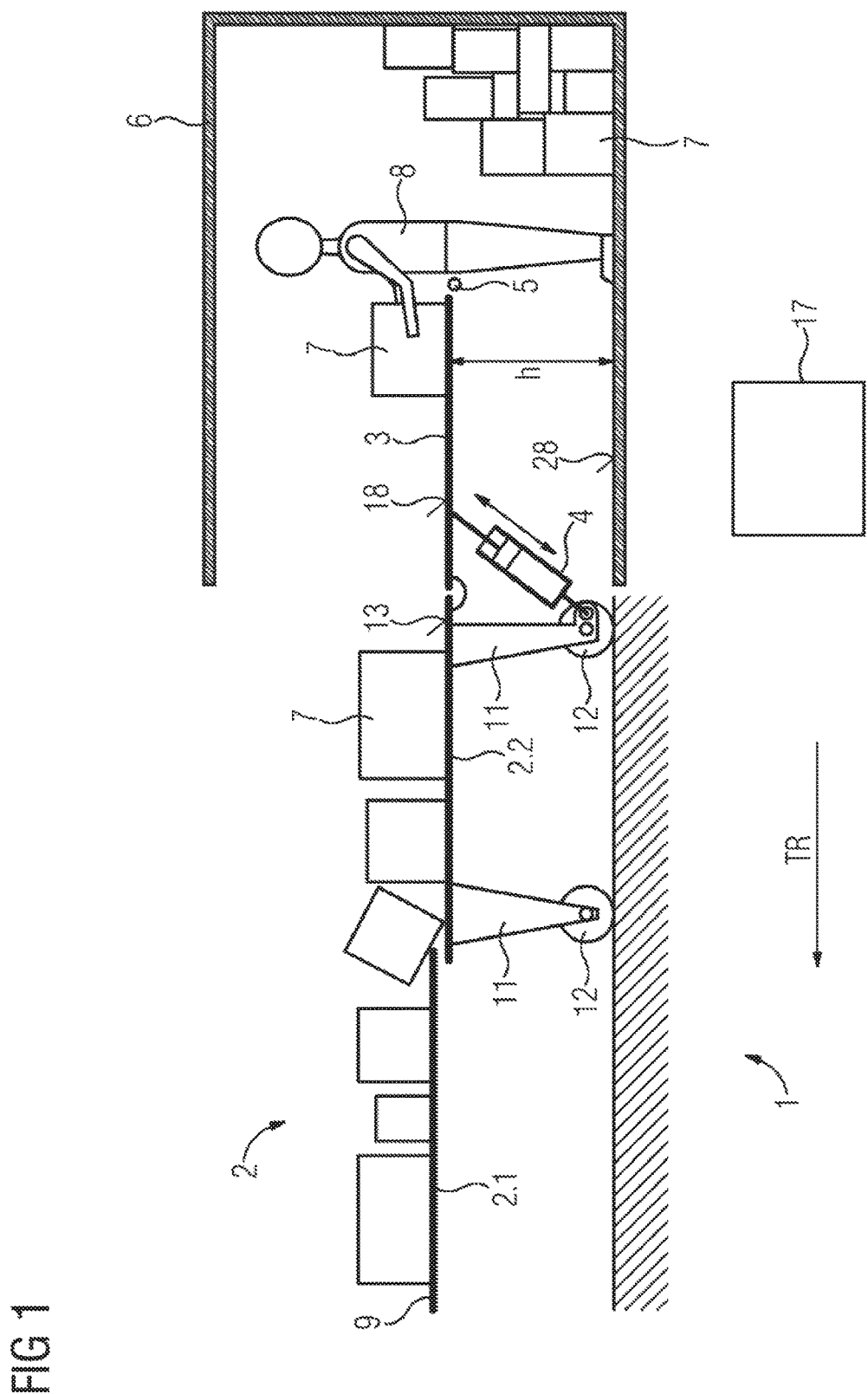
FIG. 1 shows a schematic representation of an exemplary embodiment of the inventive device in a side view.

The inventive device is described with reference to the exemplary embodiment in FIGS. 1 to 4. For the sake of simplicity, the same parts are designated with the same reference characters in the various embodiments.

The device 1 comprises a means of transport 2, an unloading head 3, a lifting means 4, a sensor apparatus 5 and a controller 17. By way of example, the device 1 is partially arranged in a transport container 6 in FIGS. 1 to 3 and is used by an operator 8 to handle objects 7.

In the exemplary embodiment in FIGS. 1 to 4, the means of transport 2 is embodied as a conveyor belt which runs essentially horizontally. The means of transport 2 has a first part 2.1 and a second part 2.2 which can be moved towards one another in the manner of a telescope and by means of which the means of transport 2 can be shortened or extended in a transport direction TR. The means of transport 2 forms a transport plane 9, upon which the objects 7 are arranged in FIGS. 1 to 3. The means of transport 2 further comprises a drive (not shown), by means of which the objects 7 disposed on the transport plane 9 can be transported in the transport direction TR. Below the transport plane 9 the means of transport 2 has an undercarriage 10, which comprises pillars 11 and wheels 12 arranged on the pillars 11.

The unloading head 3 attaches to the means of transport 2 in the transport direction TR. The unloading head 3 is connected to the means of transport 2 by way of an articulated joint 13. As a result, the unloading head 3 is embodied to be pivotable with respect to the means of transport 2, so that the height h of a free end 14 of the unloading head 3 can be adjusted. In the embodiment in FIG. 2, the unloading head 3 comprises a number of mounted balls 15, which are arranged at a distance from one another in the surface of the unloading head 3. The balls 15 are embodied and arranged here in the manner of a roller table. Alternatively, the unloading head can also be embodied without balls 15 with a sliding surface or with rollers or belts which run horizontally.

In the embodiment in FIGS. 1 to 4, the lifting means 4 is arranged between the means of transport 2 and the unloading head 3 and comprises a hydraulic or pneumatic cylinder 16. The lifting means 4 is connected with the controller 17 for signaling purposes, said controller 17 actuating the lifting means 4 in order to change the position of the unloading head 3. Alternatively, the lifting means 4 may also comprise e.g. a spindle drive, a tooth-belt drive or suchlike.

The unloading head 3 defines a support plane 18 for the objects 7.

Figure 2:
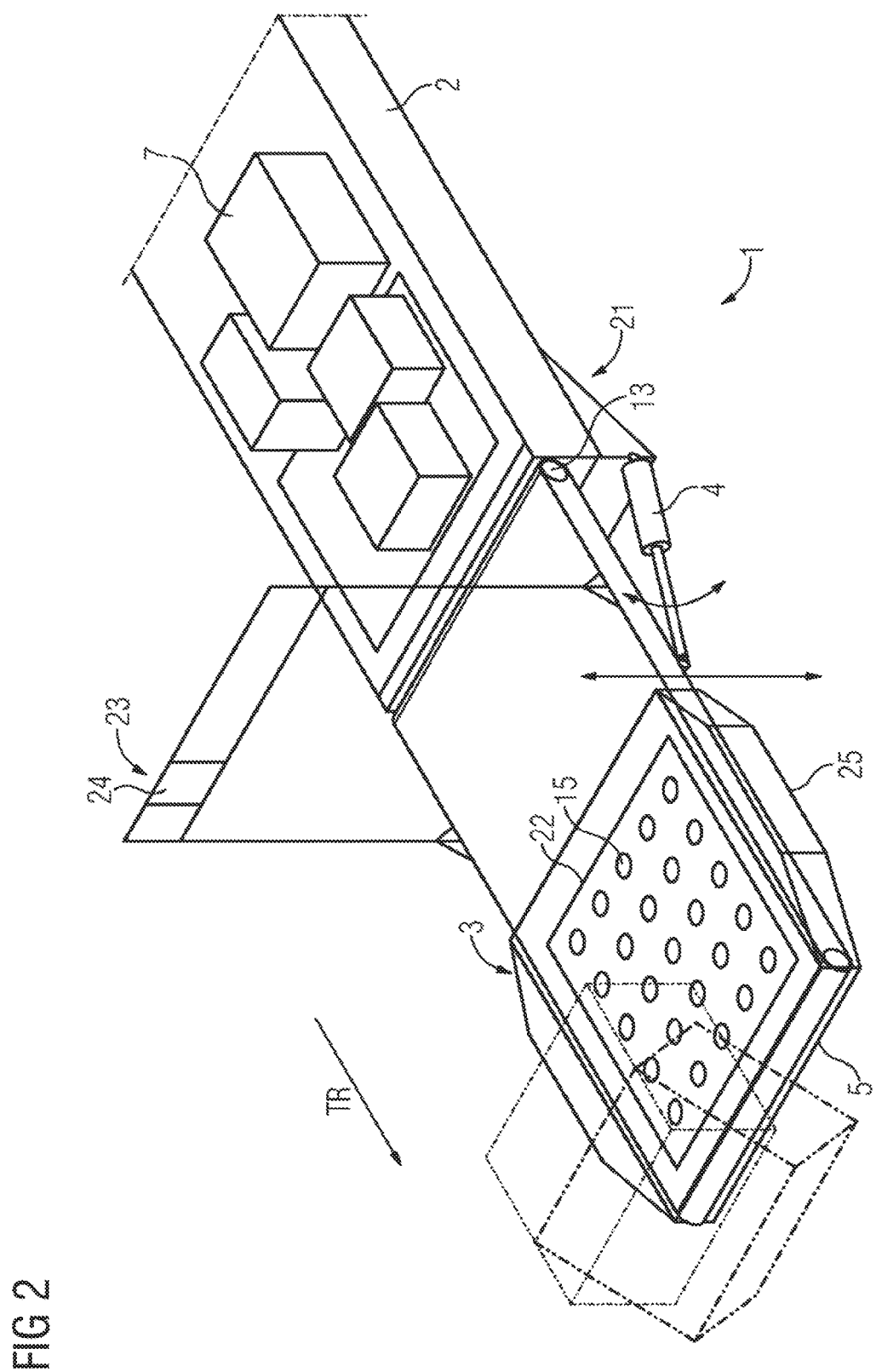
FIG. 2 shows a schematic representation of the inventive device from FIG. 1 in a perspective view.
Figure 3:
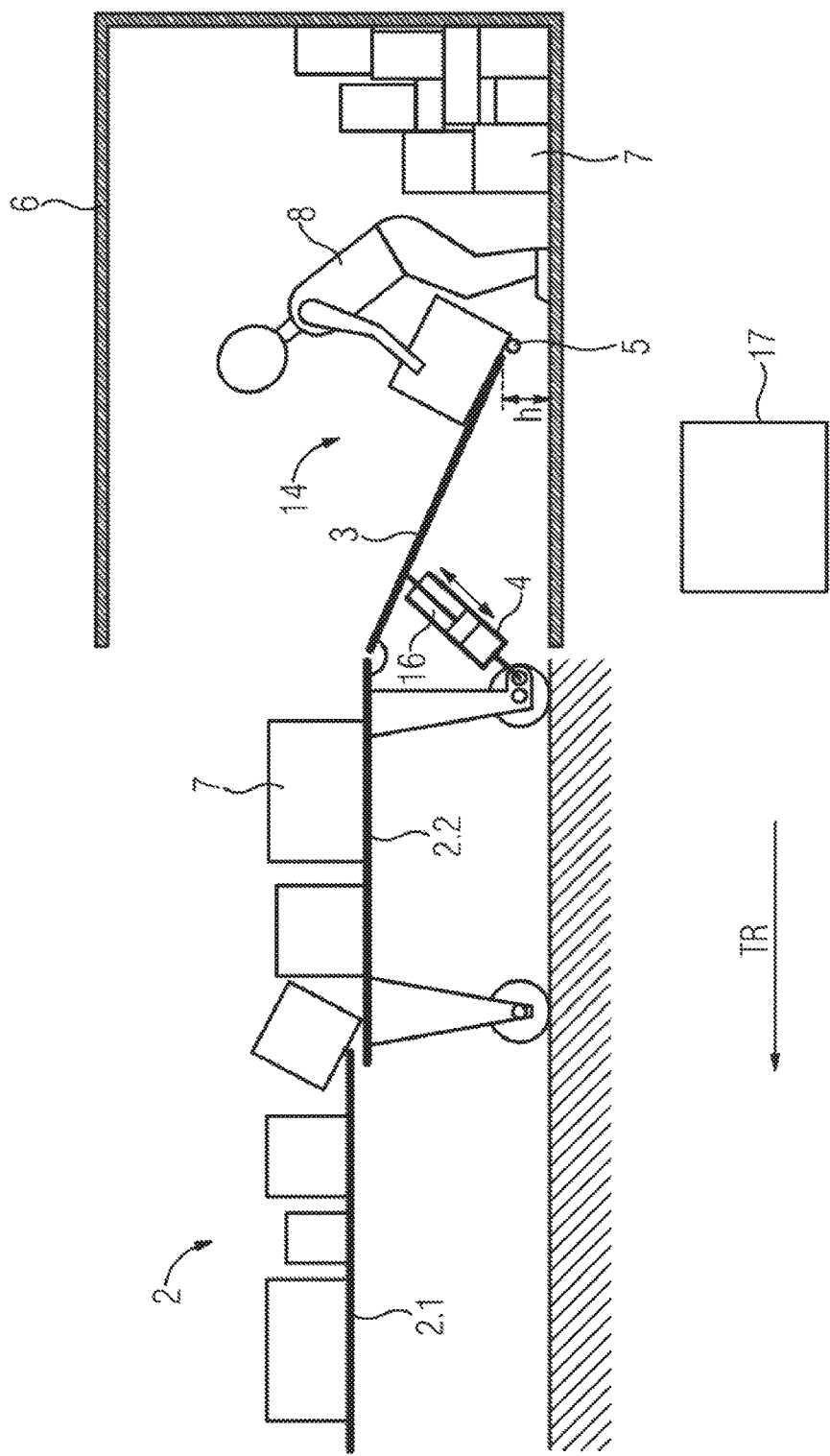
FIG. 3 shows the device from FIG. 1 in another position.
Figure 4:
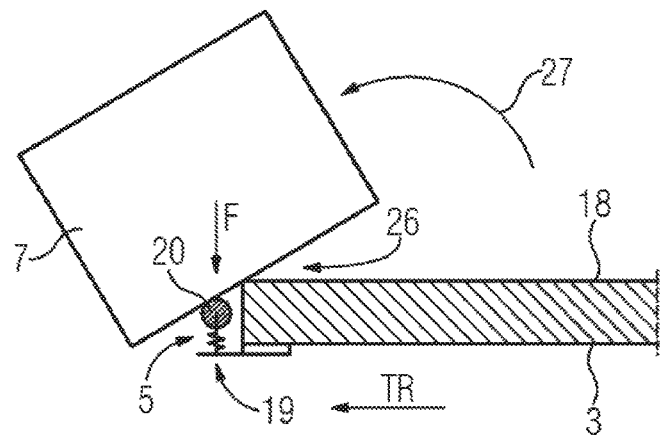
FIGS. 4-6 each show a schematic representation of different embodiments of the inventive device with sensor apparatus.

In the embodiment in FIGS. 1 to 4, the sensor apparatus 5 is arranged directly behind and to the side of the unloading head 3 in the transport direction TR. For instance, the sensor apparatus 5 comprises a push-button switch 19 and a controller cylinder 20 which runs in parallel and at a distance below the support plane 18 and is connected to the switch 19. The sensor apparatus 5 in the embodiment in FIGS. 1-3 is shown in detail in FIG. 4. The controller cylinder 20 is arranged approximately 5 mm below the support plane 18 for instance. The sensor apparatus 5 in FIG. 4 can be actuated by a pressure force F which acts from above.

The device 1 further comprises a separating apparatus 21, which is embodied in the region between the means of transport 2 and the unloading head 3. The separating apparatus 21 is essentially embodied by the controller 17 of the means of transport 2, as described in more detail below. The unloading head 3 further comprises a balance 22, by means of which the weight or the weight force of an object 7 disposed on the unloading head 3 can be determined. Alternatively, the balance 22 can also be part of the means of transport 2. The device 1 further comprises a signaling means 23 arranged above the unloading head 3, said signaling means 23 having a red indicator lamp 24 for instance.

In the embodiment in FIGS. 1 to 3, a storage area 25 is arranged on one side of the unloading head 3. The storage area 25 is embodied in the shape of a box and a base of the storage area 25 is arranged such that it is flush with the support plane 18 of the unloading head 3. Alternatively or in addition, a further storage area 25 can also be arranged above the unloading head 3 in the region of the signaling means 23.

The function of the inventive device 1 when the operator 8 loads the transport container 6 with objects 7 is described below.

The device 1 is firstly positioned by the operator 8 such that its end projects into the transport container 6, in order to stack objects 7 in the transport container 6.

Once the loading process starts, the objects 7 which are to be loaded into the transport container 6 are moved on the means of transport 2 in the transport direction TR. The objects 7 are discharged by a sorting apparatus (not shown) onto the means of transport 2 for instance. The means of transport 2 and its wheels 12 can be arranged here both inside and also outside of the transport container 6. The drive (not shown) of the means of transport 2 is actuated by way of the controller 17 and for separating purposes the controller 17 stops the means of transport 2 so that only one object 7 ever reaches the unloading head 3. Light beam systems or similar sensors can be arranged on the means of transport 2 in order to ensure an optimal positioning of the objects 7.

The separated object 7 which reaches the unloading head 3 from the means of transport 2 is supplied to the operator 8 for unloading. Here the balls 15 on the unloading head 3 can be driven or not driven. The weight of the object 7 is measured by the balance 22 on the unloading head 3 and said weight is transferred to the controller 17. If the weight of the object which the balance 22 has determined exceeds a predetermined limit value stored in the controller 17 (also referred to below as a heavy object), the controller 17 then activates the red lamp 24 of the signaling means 23. This indicates to the operator that the next object 7 to be unloaded is a heavy object. Alternatively or in addition to the red lamp 24, the signaling means 23 could equally have a loudspeaker, which outputs an acoustic signal, which can also be perceived by the operator 8 and indicates a heavy object to him.

As shown in FIGS. 1 to 4, while the object 7 is supported on the unloading head 3, the operator 8 grasps the object 7 and moves it in the direction of the edge 26 of the unloading head 3 and the sensor apparatus 5. A tilting motion 27 provoked by the operator 8 causes the object 7 to tilt toward the edge 26 and thereby actuates the controller cylinder 20 and the switch 19 and thereby triggers the sensor apparatus 5. When the sensor apparatus 5 is triggered, the unloading head 3 also supports the weight of the object 7, so that no or barely any force has to be applied by the operator 8. The triggering of the sensor apparatus 5 transferred to the controller 17 causes the controller 17 to activate the lifting means 4, which then changes the height h of the unloading head 3. In the embodiment in FIGS. 1 to 4, it is to be understood that the free end 14 of the unloading head 3 is moved by the lifting means from the high position shown in FIG. 1 into the low position shown in FIG. 3. This reduces the height h between the free end 14 of the unloading head 3 and a working surface 28 upon which the operator 8 is standing. In the embodiment in FIGS. 1 to 4, this working surface 28, which represents a working platform, is the base of the transport container 6. In the low position of the unloading head 3 shown in FIG. 3, the object 7 can be unloaded by the operator 8 easily and without exerting any force, by being rolled from the unloading head 3 by means of a further tilting motion 27. The operator 8 then slides the heavy object 7 into a suitable position in the transport container 6. In order to further assist with this positioning, the unloading head 3 or the entire device 1 can also be embodied to be pivotable toward the sides.

An object 7, the weight of which measured by the balance 22 does not exceed the limit value, is handled by the device 1 as follows.

The object 7, the weight of which does not exceed the limit value (also referred to below as a light-weight object), is separately conveyed by the controller 17, just like a heavy object, on the unloading head 3. However, the red lamp 24 is not activated because the object 7 is not a heavy object. With light-weight objects the signaling means 23 is either not activated at all or there is an additional, for example green, lamp (not shown) which signals a light-weight object to the operator 8. Since the operator 8 can unload the light-weight object manually without effort from the unloading head 3 in the high position in FIG. 1 and can stack it in the transport container 6, he will not trigger the sensor apparatus 5 and will as a result leave the unloading head 3 in the high position. This allows light-weight objects 7 to be unloaded quickly without requiring the lifting means 4 to be moved. The operator 8 has the option of collecting small light-weight objects 7 in the storage area 25 and unloading them at a later point in time. This is advantageous in that small, light-weight objects 7 can be collectively unloaded particularly quickly and stacked.

As an alternative to the mechanical controller cylinder 20, the sensor apparatus 5 can also have a light beam system, which runs in the same direction as the controller cylinder 20 and can be triggered by the tilting motion 27 of the object 7.

Figure 5:
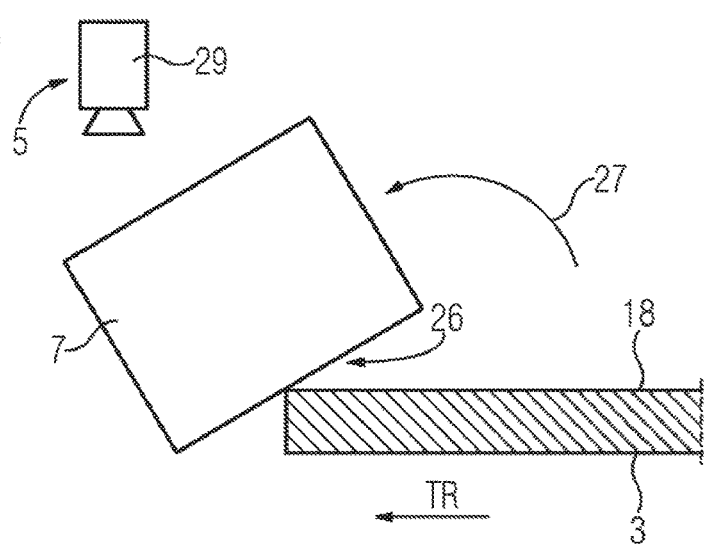

FIG. 5 shows an alternative embodiment of the sensor apparatus 5, which has a camera 29, which is connected to the controller 17 and which identifies the tilting motion 27 of the object 7 and triggers the sensor apparatus 5.

Figure 6:
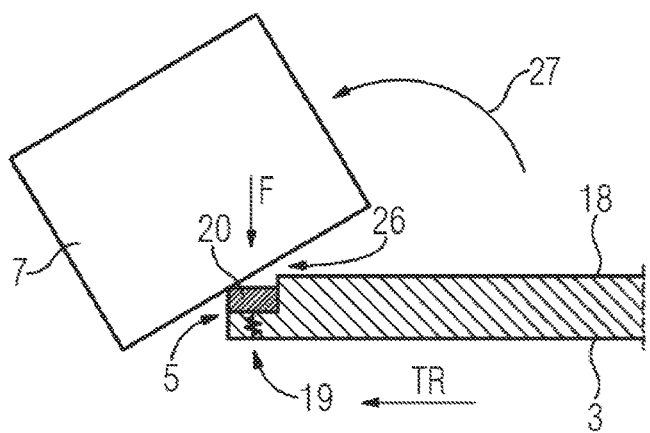

FIG. 6 shows a further alternative embodiment of the inventive sensor apparatus 5, which is integrated in the edge 26 of the unloading head 3. In this way the press cylinder 20, which is embodied here as a pressure pad, embodies the edge 26 of the unloading head 3. The tilting motion 27 of the object 7 causes the press cylinder 20 to move downwards and activates the push-button switch 19, which is arranged in the inside of the unloading head 3.

In addition, as shown in FIG. 2, the sensor device 5 can also be arranged to the side of the unloading head 3, so that the operator 8 can also unload heavy objects 7 from the side of the unloading head 3.

In order to speed up the unloading process overall, the controller 17 automatically moves the unloading head 3 from the low position shown in FIG. 3 into the high position shown in FIG. 1, after the operator has unloaded a heavy object 7 from the unloading head 3 in the low position and the sensor apparatus 5 is no longer activated.

The inventive apparatus 1 enables a rapid and more conventional loading process for light-weight objects and enables a rapid lowering of the unloading head 3 to the low position, which is approximately at the operator's knee level, for heavy objects. The lifting work involved with heavy objects 7 is thus reduced or entirely obviated for the operator 8. Furthermore, damage from heavy objects 7 falling can be avoided, which may occur for instance in devices from the prior art which cannot be lowered. The inventive device 1 relieves the operator 8 of physical stress in the case of heavy objects, which results in a significant throughput increase overall.

Figure 7:
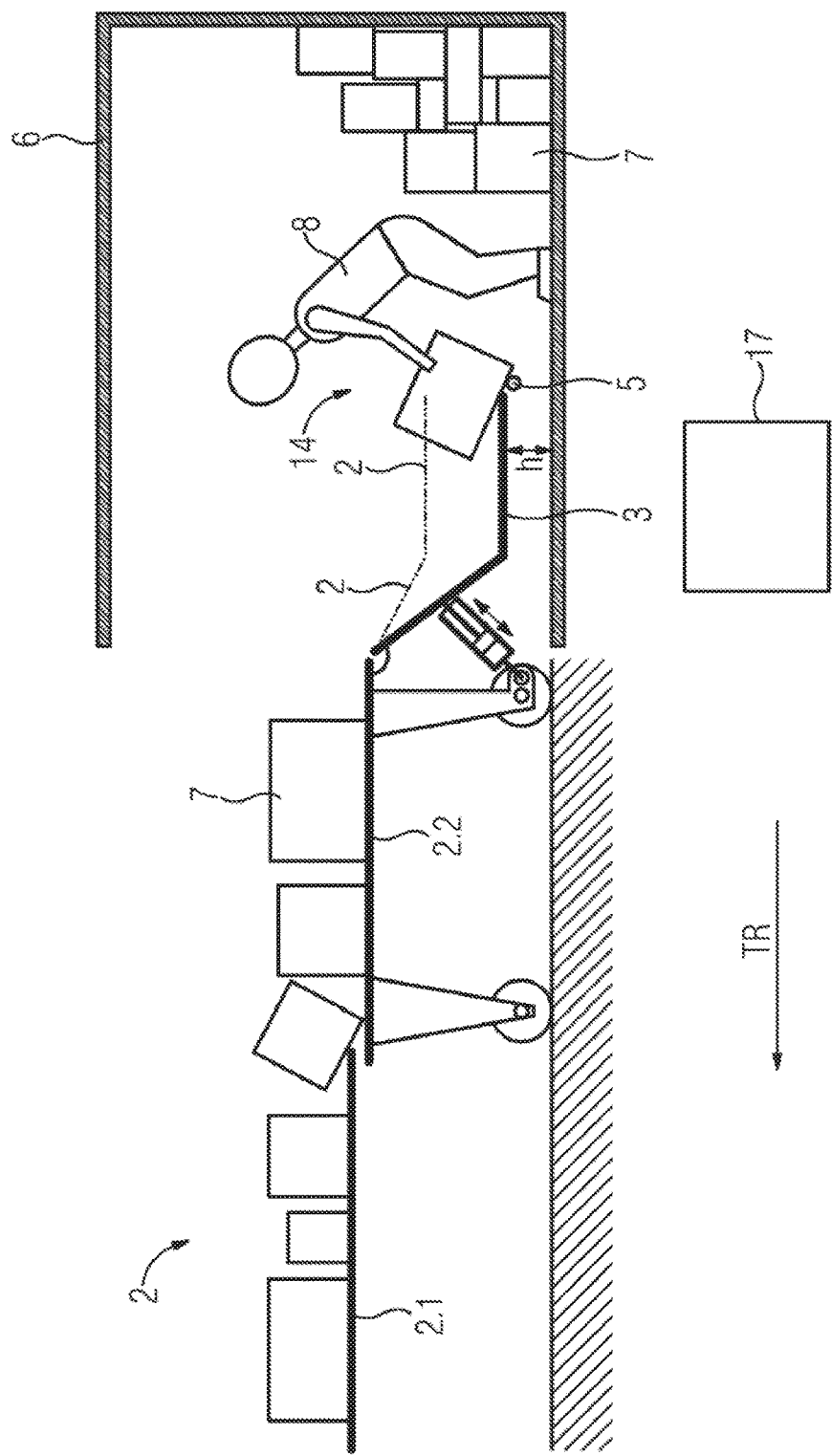
FIG. 7 shows a schematic representation of a further embodiment of the inventive device.

Finally FIG. 7 shows a further embodiment of the inventive device 1. For the sake of brevity, reference is only made to the differences from the embodiment in FIGS. 1 to 4.

In the embodiment in FIG. 7, the device 1 has a z-shaped arrangement comprising means of transport 2 and an unloading head 3, in which the unloading head 3 is aligned identically irrespective of the height h. The unloading head in FIG. 7 is thus always arranged horizontally, both in the lower position and also in the upper position shown with dashed lines.

The invention claimed is:

1. A device for handling objects, the device comprising:
an unloading head disposed to receive from a transport device individual objects to be manually unloaded by an operator and to hold the objects for manual unloading by the operator;
a lifting device connected to said unloading head and configured to adjust a height of said unloading head;
a triggerable sensor apparatus for activating said lifting device, said sensor apparatus being configured so as to be triggered when the operator grasps an object disposed on said unloading head and tilts the object forward without lifting the object from said unloading head.

2. The device according to claim 1, which further comprises a transport device connected to said unloading head for moving the objects in a transport direction toward said unloading head.

3. The device according to claim 2, wherein the device is disposed in a transport container and said unloading head is disposed adjacent said transport device in the transport direction.

4. The device according to claim 1, wherein said sensor apparatus is a pressure switch arranged behind the unloading head in the transport direction and/or to a side of said unloading head transversely to the transport direction and configured to activate said lifting device when an object is tilted to push down on said pressure sensor.

5. The device according to claim 1, wherein said sensor apparatus is a camera or a light beam system configured to recognize a tilting of an object by the operator.

6. The device according to claim 1, wherein said sensor apparatus is a switch.

7. The device according to claim 1, wherein said unloading head defines a support plane for the objects and said sensor apparatus is arranged at a level of the support plane or below the support plane.

8. The device according to claim 6, wherein said sensor apparatus is configured for triggering by an actuation force acting on said sensor apparatus.

9. The device according to claim 1, wherein said unloading head defines a support plane for the objects and said unloading head has an edge, which delimits the support plane in the transport direction or transversely to the transport direction, and wherein said sensor apparatus is integrated in at least one part of said edge or forms at least one part of said edge.

10. The device according to claim 1, which further comprises a separating apparatus configured to separate the objects in the transport direction.

11. The device according to claim 1, which further comprises scales disposed to measure a weight of the objects and a signaling device configured to output a signal for the operator regarding each object that has a weight above a predetermined limit value.

12. The device according to claim 1, which further comprises a controller connected to said sensor apparatus and said lifting device for signaling purposes, said controller being configured to automatically move said unloading head from a high position to a low position when said sensor apparatus is triggered.

13. The device according to claim 12, wherein said controller is configured, after said sensor apparatus is triggered, to move said unloading head from the low position back into the high position.

14. The device according to claim 1, which further comprises a storage area arranged on said unloading head for temporarily storing a number of objects.

15. A method for handling objects, the method which comprises:
providing a transport device with an unloading head configured to receive individual objects to be manually unloaded by an operator, and a lifting device for adjusting a level of the unloading head;
unloading the objects from the unloading head by the operator;
selectively triggering a sensor apparatus by the operator via an object disposed on the unloading head by tilting an object at the unloading head by the operator without lifting the object from the unloading head; and
upon triggering of the sensor apparatus, adjusting a level of the unloading head by way of a lifting device.

16. A device for handling objects, the device comprising:
an unloading head, disposed to receive from a transport device individual objects to be manually unloaded by an operator and to hold the objects stationary until unloaded by the operator;
a lifting device connected to said unloading head and configured to adjust a height of said unloading head;
a triggerable sensor apparatus for activating said lifting device, said sensor apparatus being configured so as to be triggered when the operator grasps an object disposed on said unloading head and tilts the object without lifting the object from the unloading head; and
at least one scale disposed to measure a weight of the objects on said unloading head, and a signaling device configured to output a signal for the operator regarding each object that has a weight above a predetermined limit value.

* * * * *